June 1, 1965     W. D. SKIDMORE     3,186,411
LUMINOUS PACIFIER
Filed April 24, 1963
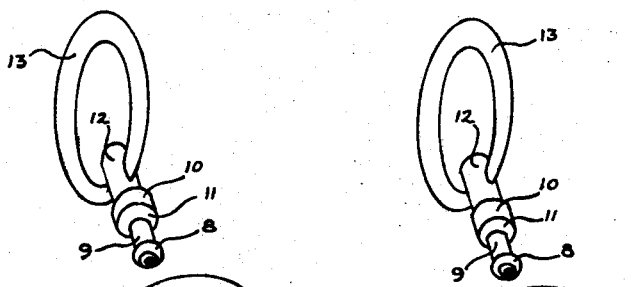
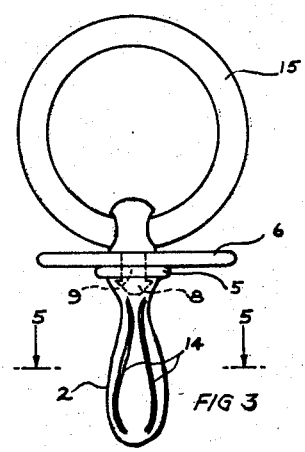
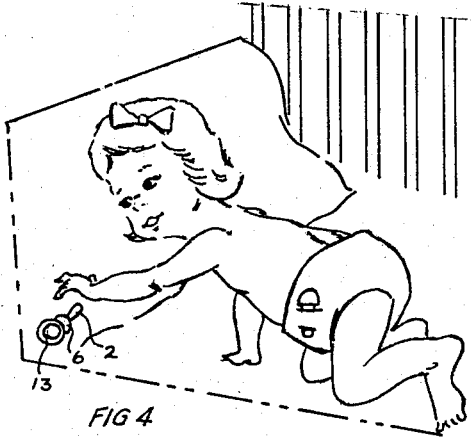
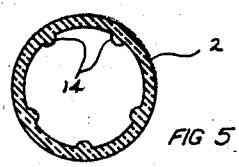
WILLIAM D. SKIDMORE
INVENTOR.
BY John J. Miller
ATT'Y

3,186,411
LUMINOUS PACIFIER
William D. Skidmore, Raleigh, N.C.
Filed Apr. 24, 1963, Ser. No. 275,452
1 Claim. (Cl. 128—360)

This invention relates to surgical instruments in general and more particularly to surgical instruments adapted to be used by infants and small children to aid in teething, tranquilizing and pacifiying said infants and small children.

In the past, many various types of surgical instruments have been used in the medical field of pediatrics to tranquilize small children and to give them a feeling of security. Over the years these devices have acquired the common term of pacifiers, and are well known not only for their tranquilizing effect but also for their therapeutic advantages in that they massage the gums of a child and thereby assist in the cutting of teeth and other medical advantages.

One of the main problems encountered by parents of small children who use pacifiers is that during the night after the child has fallen asleep the pacifier will fall from the child's mouth and thereafter the child will have a desire to suck or chew on the pacifier but since the room is dark the child cannot locate the same so he will cry until one of the parents is aroused and comes to the child's bed, locates the pacifier after turning on the lights, and gives it back to the infant.

Not only is it troublesome to have to get up to retrieve the pacifier but when the light is turned on the infant in many cases completely wakes up due to the light in the room and then proceeds to become upset and henceforth cries for some little time until soothed by the parent who must pick the child up and walk the floor or rock the child to get him back to sleep.

The pacifier of the present invention overcomes these disadvantages caused by the inherent nature of young children and parents by providing a pacifier having a luminous portion which glows in the dark so that in most cases the infant upon cracking its eyes will see the pacifier and simply reach out and pick up and replace it in its mouth and thereupon return to restful sleep without crying or becoming upset and without wakening the parents to tend the child.

Even if the child should awake, and either because of very tender age and inadequate development of physical faculties or for other reasons, and not be able to replace the pacifier into operative position, the parent upon hearing the child's cries may go to the child's bedside without turning on the distracting lights in the room, locate the pacifier due to its luminous qualities, and replace it in the child's mouth whereby the child will resume his night's rest in complete harmony and contentment.

It is therefore an object of the present invention to provide a child's pacifier, which due to its composition, has an adherent ability to give off light in the dark so that a child may after losing the pacifier during sleep locate the same and replace it in his mouth thereby continuing the tranquilizing effect of the same.

Another object of the present invention is to provide a pacifier of luminous material which allows the parent of a small infant to locate and replace the pacifier in the infant's mouth without having to turn on the lights of the room or using other artificial lighting means to locate such pacifier in the bed of the infant.

A further object of the present invention is to provide a luminous pacifier having a nipple portion incorporating a luminous material which glows in the dark to assist in the location of the pacifier at night.

Also a further object of the present invention is to provide a pacifier having luminous material in the guard or shield of the pacifier whereby said pacifier may be located by either the child or the parent without the use of any lighting means whatsoever other than inherent glow of the unit.

A further object of the present invention is to provide a luminous pacifier having a handle which is provided with a luminous material to assist in the location of said pacifier without the use of any additional artificial lighting.

Other objects and advantages of the present invention will become apparent and obvious from a study of the following description and the accompanying drawings which are merely illustrative of the present invention.

In the drawings:

FIG. 1 is an exploded view, in perspective, of one embodiment of the present invention;

FIG. 2 is an exploded view, in perspective, of another embodiment of the present invention;

FIG. 3 is a side elevational view of a further embodiment of the present invention;

FIG. 4 is a perspective view of the present invention showing a manner in which it may be used by the infant during the hours of darkness; and FIG. 5 is a cross sectional of line 5—5 of FIG. 3.

With further reference to the drawings, FIG. 1 discloses an exploded perspective of a preferred embodiment of the present invention wherein a pliable generally cylindrical preferably hollow tube portion 1 which is closed at the outer end thereof is inserted into the nipple 2. The nipple has a front portion 3 and a rear portion 4. Said rear portion 4 has an enlarged area 5 integrally molded thereinto which bears against the shield portion 6 which is generally washer shaped with a central opening 7 of such a size to accommodate the bulbous portion 8 of the shaft 9. Integrally molded onto the end of the shaft 9 opposite the bulbous portion 8 is an enlarged portion 10 having a shoulder 11 which is adapted to contactively engage the shield portion 6. Located directly behind and connected to said enlarged portion 10 is handle supporting portion 12 to which is connected either movably or fixedly a handle 13.

The nipple 2 of the pacifier of the present invention is preferably made of a translucent material so that when the pliable cylindrical portion 1 is inserted into said nipple portion 2 any light which is given off due to the luminous composition of the cylindrical portion 1 may be seen through the protective nipple 2.

The construction of the first embodiment of the present invention comprises the nipple 2 which has inserted thereinto a pliable cylindrical portion 1 which has the ability to give off light and be seen of its own accord when in a dark place. The shield 6 is placed with the opening 7 in axial alignment with the longitudinal axis of the cylinder 1 and the nipple 2. The bulbous portion 8 of the shaft 9 is placed through the opening 7 of the shield 6 and into the enlarged portion 5 of the rear section 4 of the nipple 2 in such a manner that the shoulder 11 rests snuggly against the shield 6 and bulbous or enlarged portion 8 of the shaft 9 is in the rear portion 4 of the nipple 2. The constricting tendancy of the enlarged portion 5, causes said portion to tightly grip the shaft 9 wherein the various parts of the pacifier are held in fixed co-operative relationship.

Another embodiment of the present invention is disclosed in FIG. 2 wherein the nipple portion 2 of the pacifier has ribs 14 incorporated thereinto. These ribs are composed of a luminous material, are integrally molded into the nipple and serve to increase its strength and rigidity to present collapse thereof. These luminous ribs appear as lines within the nipple portion 2 when the pacifier is placed in the dark. The nipple portion of this embodiment has translucent properties as hereinbefore described.

Over the years various manufacturers of baby pacifiers have discovered that certain children require, or like, soft pliable air-filled pacifiers while others like harder firmer pacifiers. To give a variety to the purchasers of pacifiers it is desirable to eliminate the pliable cylinder 1 from the interior of the nipple 2 thereby giving an air-filled nipple instead of a pliable yet firmer nipple utilizing the insert. To still allow the luminous effect of the invention disclosed in FIG. 1 using the luminous insert 1 the ridges or ribs 14 which are internally disposed on the inside of the hollow nipple portion 2 give the same advantages of the embodiment of FIG. 1.

For convenience and economy in the manufacture of various types of luminous pacifiers it may be desirable to produce the firmer pacifier with the pliable insert by having internally projecting luminous ridges to make the pacifier locatable in the dark and thus eliminate the use of luminous material in the insert. 1.

FIG. 3 discloses another modification of the present invention wherein the tube shaped handle portion 15 is formed of a translucent material with luminous compositions coating the interior thereof whereby when the pacifier is placed in a darkened room the handle 15 will emit a light which enables either the parent or the infant to locate the pacifier without the use of other lighting means.

Another means of obtaining the desired result is to incorporate luminous material into the bulbous portion 8 of the shaft 9. In using this means of obtaining luminescence for the pacifier a translucent nipple 2 is used as disclosed in FIG. 1 so that the bulbous luminous portion may be seen clearly through the clear nipple 2 and in this way will lend the pacifier to easy location in the darkness.

FIG. 5 is a cross-sectional of line 5—5 of FIG. 3 and discloses the translucent outer shell of the nipple 2 with inwardly projecting luminous ridges 14 running generally parallel to the longitudinal axis of said nipple to add strength and rigidity thereto and give lined luminous effect to the nipple when it is placed in a darkened area.

Of course, if it is felt advantageous, the shield 6 may be made of a luminous material so that it will glow in the dark and thereby be visable from any direction in which the pacifier is viewed. This means of incorporating luminous material into a baby pacifier may be accomplished either by having luminous materials made into the shield during the preparing or molding process or by having 3 or more layers arranged in such a manner that the outer most layers will form a protective translucent covering while the innermost layer will be sandwiched therebetween and will contain luminous material in sufficient amounts to give off an attracting light when placed in a dark area.

FIG. 4 discloses one manner in which the present invention may be used wherein, when during the night the child wakes he need only arouse enough to open his eyes and upon seeing the pacifier glowing next to him reach out, grasp the pacifier, replace it in his mouth and return to contented sleep.

The present invention, of course, may be carried out in other specific ways than those herein set forth without departing from the spirit and essential characteristics of the invention. The present embodiments are, therefore, to be considered in all respect as illustrative and not restrictive, and all changes coming within the meaning and equivalency range of the appended claim are intended to be embraced therein.

What I claim is:

A pacifier for an infant comprising a shaft having an enlarged portion at one end and a bulbous portion at the opposite end, a handle connected to said enlarged portion, a shield removably carried by said shaft, a hollow translucent imperforate nipple mounted on said bulbous portion and engageable with said shield for retaining said shield on said shaft, a plurality of equally spaced ribs extending substantially the full length of said nipple and integrally formed on the internal periphery thereof, said ribs being constructed of flexible luminescent material which will absorb light during periods of light and will emit light during periods of darkness, said ribs serving to increase the strength and rigidity of said nipple to prevent collapsing thereof, whereby the firmness of said nipple is increased and said pacifier can be located regardless of the absence of an outside source of light.

References Cited by the Examiner
UNITED STATES PATENTS

| | | | |
|---|---|---|---|
| 526,932 | 10/94 | Metzger | 128—360 |
| 2,644,890 | 7/53 | Holliman | 250—71 |
| 2,714,304 | 8/55 | Dedda | 250—71 X |
| 2,717,603 | 9/55 | Colm | 128—360 |
| 2,860,639 | 11/58 | Hoover | 128—359 |

RICHARD A. GAUDET, *Primary Examiner.*

JORDAN FRANKLIN, *Examiner.*